US006944736B2

(12) United States Patent
Wilson et al.

(10) Patent No.: US 6,944,736 B2
(45) Date of Patent: Sep. 13, 2005

(54) MANAGING LATENCIES IN ACCESSING MEMORY OF COMPUTER SYSTEMS

(75) Inventors: Kenneth M. Wilson, San Jose, CA (US); Robert B. Aglietti, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 10/044,364

(22) Filed: Jan. 11, 2002

(65) Prior Publication Data

US 2003/0005251 A1 Jan. 2, 2003

Related U.S. Application Data

(63) Continuation-in-part of application No. 09/896,043, filed on Jun. 28, 2001.

(51) Int. Cl.[7] .............................. G06F 9/48; G06F 12/00
(52) U.S. Cl. ........................ 711/167; 718/100; 711/113
(58) Field of Search .......................... 74/167, 158, 168, 74/113; 712/228, 233, 244; 710/117; 711/113, 158, 167, 168; 718/100, 103, 104

(56) References Cited

U.S. PATENT DOCUMENTS

| | | | | |
|---|---|---|---|---|
| 5,297,265 A | | 3/1994 | Frank et al. ................. | 711/202 |
| 5,784,582 A | * | 7/1998 | Hughes ....................... | 710/117 |
| 6,049,867 A | * | 4/2000 | Eickemeyer et al. ......... | 712/228 |
| 6,233,599 B1 | * | 5/2001 | Nation et al. ............... | 718/102 |
| 6,418,510 B1 | * | 7/2002 | Lamberts .................... | 711/113 |
| 6,697,935 B1 | * | 2/2004 | Borkenhagen et al. ...... | 712/228 |

* cited by examiner

*Primary Examiner*—Gary Portka
(74) *Attorney, Agent, or Firm*—Tuan V. Ngo

(57) ABSTRACT

The present invention, in various embodiments, provides techniques for managing latencies in accessing memory of computer systems. In one embodiment, upon accessing the memory system for a piece of data used by a first process, a latency manager determines the access time to acquire the piece of data in the memory system. The latency manager then compares the determined access time to a threshold. If the determined access time is greater than the threshold, the latency manager triggers an interrupt for the operating system to switch threads or processes so that execution of the first process is postponed and execution of a second process starts. Various embodiments include the latency manager is polled for the access time when the processor is stalled, the latency manager triggers a process switch when a particular memory subsystem is accessed, etc.

25 Claims, 3 Drawing Sheets

US 6,944,736 B2

MANAGING LATENCIES IN ACCESSING MEMORY OF COMPUTER SYSTEMS

RELATED CASE

This application is a continuation-in-part of copending application Ser. No. 09/896,043 by Wilson et al., entitled "Memory Table and Memory Manager for Use in Memory Management," filed Jun. 28, 2001.

FIELD OF THE INVENTION

The present invention relates generally to managing computer memory systems and, more specifically, to managing latencies in memory accesses.

BACKGROUND OF THE INVENTION

Currently, in various situations, a processor or operating system accessing memory does not know the access time, e.g., the time it takes to acquire the data from the memory system. Processor time and other resources can be wasted due to this memory access time because during this time the processor is idled waiting for the access data. Further, the access time can be very long such as in case of a memory page miss in which a slow device like a hard disc is accessed. In some approaches, a process seeking the access data keeps waiting for the data until the allocated wait time runs out, at that time the process is put in the background.

Based on the foregoing, it is clearly desirable that mechanisms be provided to solve the above deficiencies and related problems.

SUMMARY OF THE INVENTION

The present invention, in various embodiments, provides techniques for managing latencies in accessing memory of computer systems. In one embodiment, upon accessing the memory system for a piece of data used by a first process, a latency manager determines the access time to acquire the piece of data in the memory system. The latency manager then compares the determined access time to a threshold. If the determined access time is greater than the threshold, the latency manager notifies the operating system to switch threads or processes so that execution of the first process is postponed and execution of a second process starts. Various embodiments include the latency manager is polled for the access time when the processor is stalled, the latency manager triggers a process switch when a particular memory subsystem is accessed, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Hardware Overview

Figure 1:
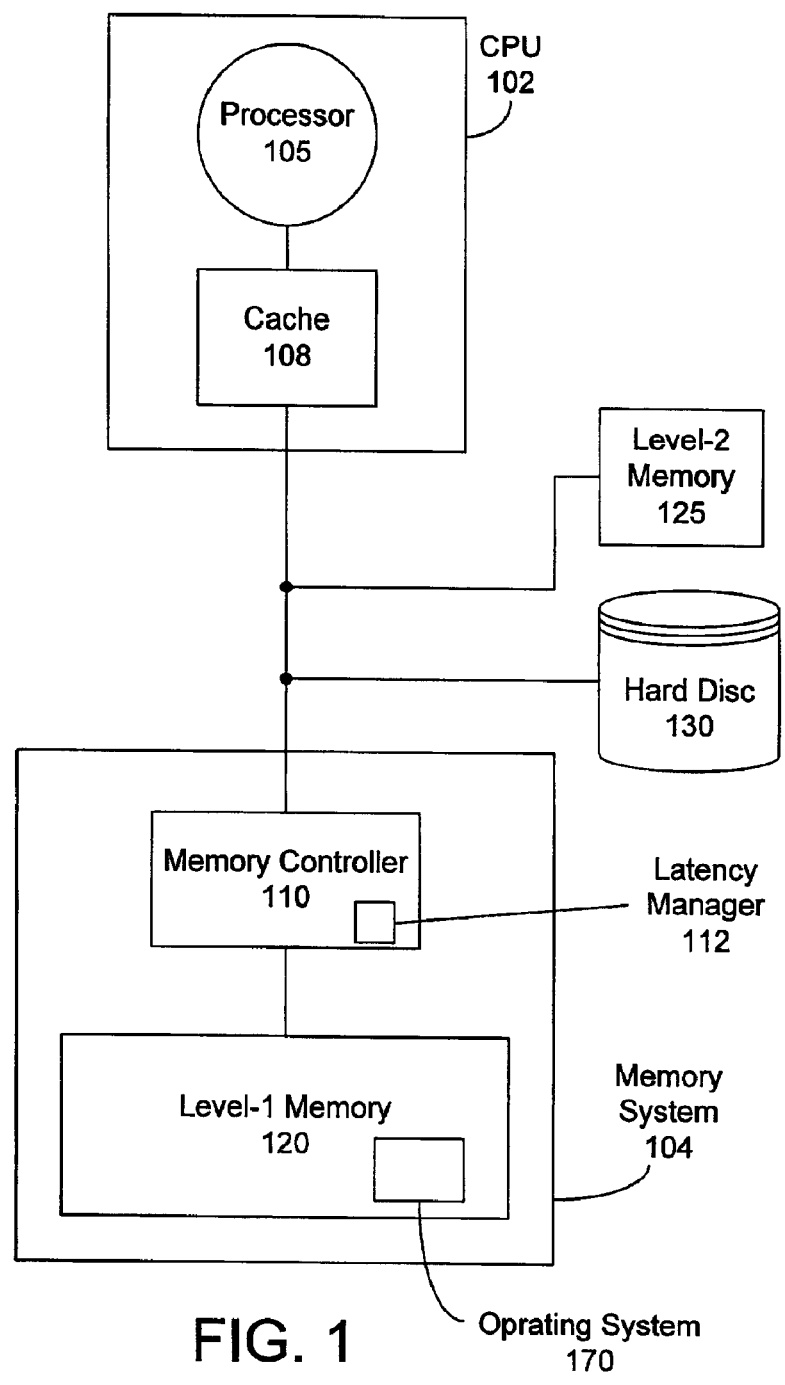
FIG. 1 shows a first system upon which techniques of the invention may be implemented.

FIG. 1 shows a processor system 100 upon which techniques of the invention may be implemented. System 100 includes, in relevant part, a central processing unit (CPU) 102, a memory system 104, and a hard disc 130. CPU 102 in turns includes a processor 105 and cache memory 108, while memory system 104 includes a memory controller 110, level-1 memory 120, and level-2 memory 125. Memory system 104 is commonly referred to as main memory from which program instructions are executed and program data are manipulated. Memory controller 110 includes latency manager 112. Level-2 memory 125 is shown outside of system 104 to illustrate that accessing level-2 memory 125 takes relatively longer than accessing level-1 memory 120. System 100 normally runs by an operating system 170 resided in level-1 memory 120. Processor 105, cache memory 108, memory controller 110, level-1 memory 120, level-2 memory 125, hard disc 130, and operating system 170 are common computer components. Each of cache 108, level-1 memory 120, level-2 memory 125, and hard disc 130 may be referred to as a memory subsystem since each stores data for system 100.

In one embodiment, data in system 100 is accessed in a specific order, such as, from a fast memory subsystem (e.g., cache) to a slow memory subsystem (e.g., hard disc, personal computer memory card international association (PCMCIA) card, etc). However, techniques of the invention are not limited to that order, but are applicable in any other order such as a random order, an order independent from the access time of the memory subsystems, a non-sequential order, e.g., an order in which one subsystem is not necessarily always followed by the same subsystem, etc. For illustration purposes, upon a memory access for a piece of data, the data is accessed (searched) in the order of cache 108, level-1 memory 120, level-2 memory 125, and hard disc 130. If the data is missed (e.g., not found) in cache 108, then it is searched in level-1 memory 120. If it is missed in level-1 memory 120, then it is searched in level-2 memory 125. If it is missed in level-2 memory 125, then it is searched in hard disc 130, etc. Generally, a time to access each memory subsystem ranges from a minimum time $t_{min}$ to a maximum time $t_{max}$, and any time between this $t_{min}$ to $t_{max}$ range, including an average time $t_{ave}$, can be used as an access time for that subsystem. Selecting a time, e.g., $t_{min}$, $t_{ave}$, or $t_{max}$ as an access time for a memory subsystem varies depending on various factors including the goals and priorities of system designers designing the system. If the time to access cache 108, level-1 memory 120, level-2 memory 125, and hard disc 130 is designated as times t1, t2, t3, and t4, then, in one embodiment, times t1, t2, t3, and t4 increase in that order, i.e., t4>t3>t2>t1.

In this document, the configuration of system 100 in FIG. 1 is used only as an example; the techniques disclosed herein may be implemented in other configurations of a processing system. For example, cache 108 can be part of processor 105, CPU 102, memory system 104, etc; there may be more than one processor 105 in CPU 102 and/or more than one CPU 102; there may be various levels of cache, memory, hard disc, and other storage devices that constitute memory system 104; memory latency manager 112 may be in CPU 102's instruction fetch unit, load/store unit, bus interface, main memory controller, or other locations for latency manager 112 to acquire or estimate enough information to determine the access time for a piece of data.

Latency Manager

In the FIG. 1 example, latency manager 112 resides in memory controller 110. However, in general, latency manger 112 is placed in the data path of the access data, e.g., between processor 105 and the memory subsystems that store the data, including, for example, cache 108, level-1 memory 120, level-2 memory, hard disc 130, memory in PCMCIA cards, etc. Placing latency manager 112 in the data path is beneficial because latency manager 112 may efficiently acquires the data access time. In embodiments where latency manger 112 is not in the access data path, additional communications, such as messages or signals, are usually implemented to communicate the latencies with latency manager 112.

In one embodiment, latency manager 112 stores a latency threshold $t_{th}$ and, upon a memory access for a piece of data of a first process, latency manager 112 determines the access time to acquire that particular piece of data. Latency manager 112 then compares the determined access time to threshold $t_{th}$. If the determined access time is greater than threshold $t_{th}$, then latency manager 112 provides that information to an appropriate intelligence to take appropriate actions. The intelligence could be any intelligent logic including hardware, software, firmware, such as CPU 102, processor 105, operating system 107, software running on the processor, hardware or software managing the memory system, etc. In one embodiment, latency manager 112 provides the information to processor 105 and/or operating system 170 for them to take actions, such as to cause a performance monitor of memory subsystem 104 or of system 100 as a whole, to postpone execution of the first process/thread, to cause process switches, etc. Latency manager 112 may also directly cause such actions to be performed. In one embodiment and for illustration purposes, latency manager 112's action triggers a process switch so that execution of the first process is postponed and execution of a second process may start. In one embodiment, latency manager 112 puts the first process in a sleeping queue or schedules that process out until it is ready to be executed again. In an alternative embodiment, latency manager 112 notifies or triggers an interrupt to operating system 170. As soon as operating system 170 recognizes the reason for interrupt, operating system 170 responds by switching out the currently executing process to postpone execution of this process and allows execution of another process. However, if the determined access time is less than or equal to threshold $t_{th}$, then latency manager 112 takes no special actions, e.g., allows system 100 to function as usual. In the above situations, postponing executing the first process prevents wasting resources due to waiting for the access data. As an example, if $t4>t3>t_{th}>t2>t1$, then in response to a memory access in cache 108 or in level-1 memory 120, latency manager 112 does not take special actions. However, in response to a memory access in level-2 memory 125 or in hard disc 130, latency manager 112's actions initiate a process switch. Those skilled in the art will recognize that a process is an executing program and may be used loosely as a "task." Further, a thread is a part of a program that can execute independent of other parts. For illustration purposes, the term "process" used in this document refers to a process, a program, a thread, or their equivalences.

In one embodiment, latency manager 112's action causes a process switch when the access data is missed in a predetermined memory subsystem. This is conveniently implemented when the data is accessed in an order from a faster subsystem to a slower subsystem in which as the data is missed in one subsystem, the data is searched in a next slower subsystem up to a point where accessing a too slow subsystem would waste too much processor idle time. For example, let the search be in the order of cache 108, level-1 memory 120, level-2 memory 125, and hard disc 130, and it has been determined that accessing level-2 memory 125 takes too long for processor 105 to wait, then level-1 memory 120 is "earmarked," such that when the access data is missed in level-1 memory subsystem 120, a process switch is triggered. In this document, a "slower" subsystem has a longer access time while a "faster" subsystem has a shorter access time.

In one embodiment, upon a memory access, processor 105 continues performing its functions until it is stalled, such as when processor 105 completes its instruction queue and has no other instructions to execute. Processor 105 then polls latency manager 112 or other appropriate intelligence to determine the time it takes to complete the memory access. If the time taken to complete the memory access is greater than a predetermined time, e.g., the threshold $t_{th}$, then a process switch is triggered. In this embodiment, processor time to poll latency manager 112 does not add costs to system 100 because processor 105, being stalled and thus idled, would not otherwise execute any beneficial instructions.

In one embodiment, a counter is used to determine whether to switch processes. In general, latency manager 112 knows whether a data access is about to occur, and, as soon as the data access starts, latency manager 112 enables the counter to count the time elapsed from the time the data access starts. This counted time thus keeps increasing as the data is being accessed in memory system 104. When the counted time increases greater than threshold $t_{th}$, a switch process is triggered. For illustrative purposes, the access time for cache 108, level-1 memory 120, and level-2 memory 125 is 10, 100, and 300 time units, respectively. Further, it is determined that a data access to level-2 memory 125 will cause a process switch. As soon as the counter counts past 100, which is the maximum access time for level-1 memory 120, and which is also the latency threshold $t_{th}$, latency manager 112 triggers a process switch. In one embodiment, latency manager 112 is placed in processor 105's outstanding memory access buffer (not shown), and each buffer includes a counter to keep track of how long a memory access has been outstanding. If one or more counters exceed latency threshold $t_{th}$, then a process switch is triggered.

In various embodiments, a memory access may result in searching for the same data in multiple places, which is commonly referred to as parallel access since the same access is sent to different memory subsystems, e.g., to both a faster subsystem and a slower subsystem. Parallel memory access does not add cost to the system, but saves time in accessing the slower subsystem when the data is missed in the faster subsystem because the data is searched in the slower subsystem in parallel with searching in the faster subsystem. In one embodiment, the initial access time is that of the faster subsystem, and, when the access misses in the faster subsystem, the access time is that of the slower subsystem.

A multiple memory access occurs in case of accessing multiple pieces of data. Normally, while the first access is in progress, the second access starts. In one embodiment, upon a multiple memory access, latency manger 112 uses the longest access time to determine a process switch. In such situations, for comparison to threshold $t_{th}$, latency manager 112 is updated with a new access latency if this access latency is greater than the last latency stored in latency manager 112.

Alternatively, latency manager 112 is loaded with a new access latency upon each miss in a memory subsystem. For example, before the first memory access, latency manager 112 is loaded with t1, e.g., the access time for cache 108. Latency manager 112 may also be initialized with a value 0 because, in one embodiment, as long as the predicted access time is less than $t_{th}$, latency manager 112 does not take special actions. When the memory access misses in cache 108, latency manager 112 is loaded with access time t2 of level-1 memory 120. When the memory access misses in level-1 memory 120, latency manager 112 is loaded with access time t3 of level-2 memory 125, and when the memory access misses in level-2 memory 125, latency manager 112 is loaded with access time t4 of hard disc 130, etc.

Variations

Figure 2:
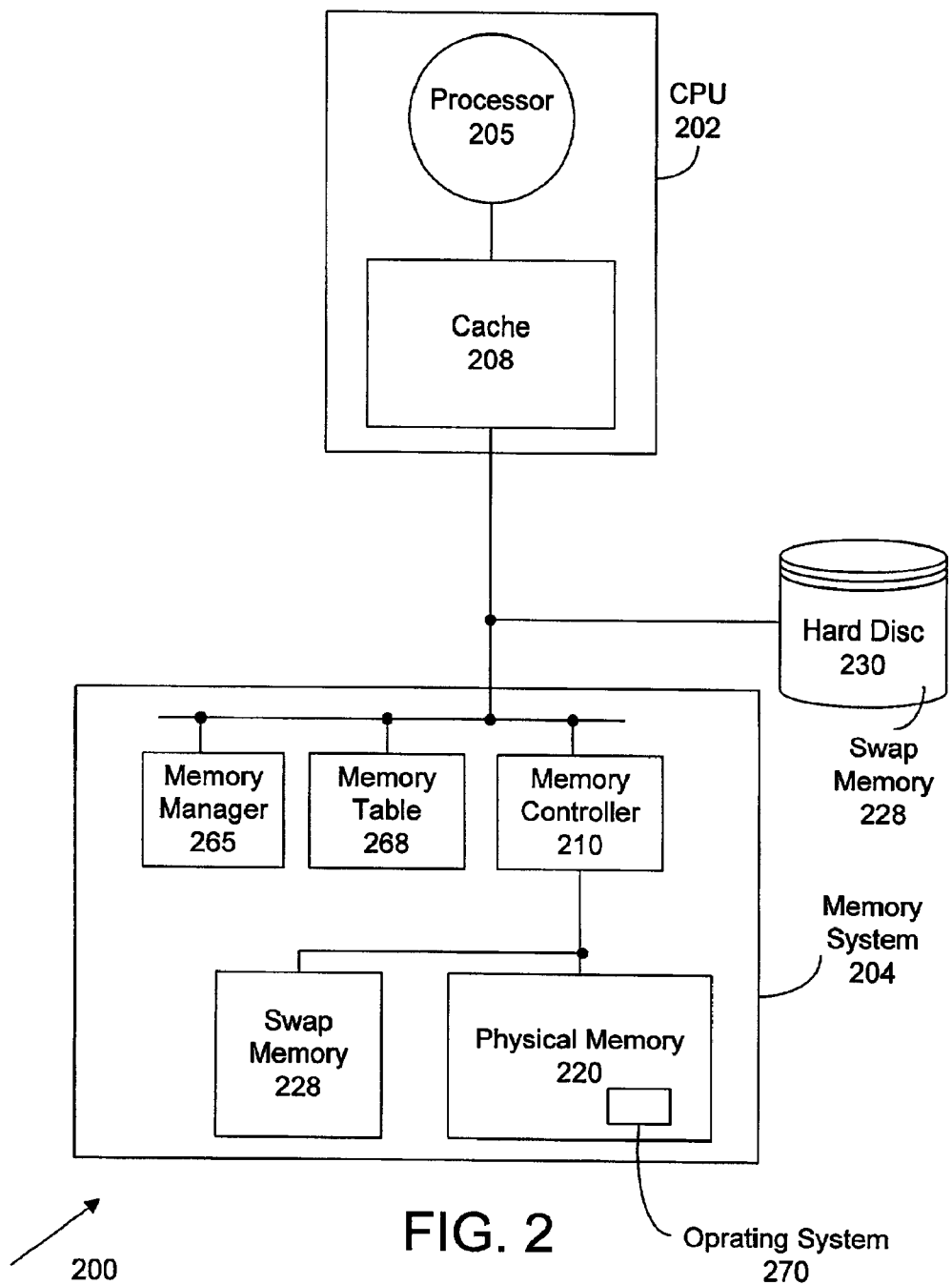
FIG. 2 shows a second system upon which techniques of the invention may be implemented.

FIG. 2 shows a system 200 upon which techniques of the invention may be implemented. System 200 is described in details in copending application Ser. No. 09/896043, of which this application is a continuation-in-part (above). In this system 200, cache 208, physical memory 220, swap memory 228, hard disc 230, and their equivalences are considered memory subsystems. Each memory subsystem corresponds to an access time, e.g., time tt1, tt2, tt3, tt4 for cache 208, physical memory 220, swap memory 228, and hard disc 230, respectively.

A latency manager, e.g., latency manager 212 (not shown), which is comparable to latency manager 112 in system 100, may be implemented in system 200. Latency manager 212 works by itself or with memory manager 265 and/or memory table 268 to perform latency manager 212's functions consistent with the techniques disclosed herein. In one embodiment, latency manager 212 is advantageously resided in memory manager 265 or memory table 268 because both of them are usually in the data path and contain information related to the access data, the access times to the memory subsystems, etc.

In one embodiment, it is predetermined that accessing some particular subsystems that have a long access time, e.g., swap memory 228, hard disc 230, etc., would cause a process switch. In this embodiment, latency manager 212 includes information, such as logical bits, to determine whether such a process switch is desirable. For example, each memory subsystem corresponds to a bit, and the bits corresponding to cache 208 and physical memory 220 are set to a logical zero to indicate that accessing data in these memory subsystems do not cause a process switch. Similarly, the bits corresponding to swap memory 228 and hard disc 230 are set to a logical one to indicate that accessing data in these memory subsystems do cause a process switch. When it is determined that a subsystem of memory system 204 is about to be accessed, latency manager 212 reviews the bit corresponding to that subsystem to determine a process switch. For example, if the bit is at a logical high, then latency manager 212 sends a signal that can trigger a process switch; otherwise, no special action is desirable.

Techniques of the invention are advantageously used in system 200 because memory system 204, with the implementation of memory manger 265, in various embodiments manages its memory subsystems independent of processor 205 and operating system 270. As a result, access times to memory subsystems of memory system 204, e.g., tt1, tt2, tt3, tt4, etc., are further hidden from processor 205 and operating system 270. This can cause long idle processor time. Latency manager 212, working with memory manger 265 and memory table 268 can provide relevant access times to processor 205 and operating system 270. Together, they make appropriate decisions, e.g., switching processes to prevent wasting idle processor time.

Other Considerations

Causes for process switches and trigger threshold $t_{th}$ vary depending on various factors. For example, different types of memory subsystems or different types of instructions may have different trigger thresholds. In one embodiment, threshold $t_{th}$ is greater than the time to access level-1 memory and cache subsystems. This threshold $t_{th}$ is determined based on various factors such as what is a realistic time for a memory access, the cost of switching the processes, the cost of wasting idle processor time, etc. A particular instruction may or may not trigger a process switch. In one embodiment, a store instruction, e.g., writing data to memory, does not cause a process switch because the processor does not wait for the results of such an instruction. Consequently, threshold $t_{th}$ is set to a very high value so that no process switch will occur. Conversely, a load instruction, e.g., getting data from memory, can cause a process switch, and thus the trigger threshold $t_{th}$, can be set accordingly, e.g., greater than t1 and t2 and lesser than t3 and t4 as in the above example.

Access times t1, t2, t3, t4, tt1, tt2, tt3, tt4, and threshold $t_{th}$ may be measured in absolute time values such as nano seconds, micro seconds, etc., or in terms of system 100's cycles or frequencies.

Generally, mechanisms are provided to prevent unwanted process switches in situations such as initiating a second switch (e.g., interrupt) due to data remained from the first switch, initiating a second counter for a second process switch while a first process switch is in progress, etc. In one embodiment, the memory access latency stored in latency manager 112 is cleared when the latency manager interrupt is triggered, threshold $t_{th}$ is updated, a process is switched, etc. In an alternative embodiment, processor 105 ignores a second switch while the first switch is in progress.

Computer System Overview

Figure 3:
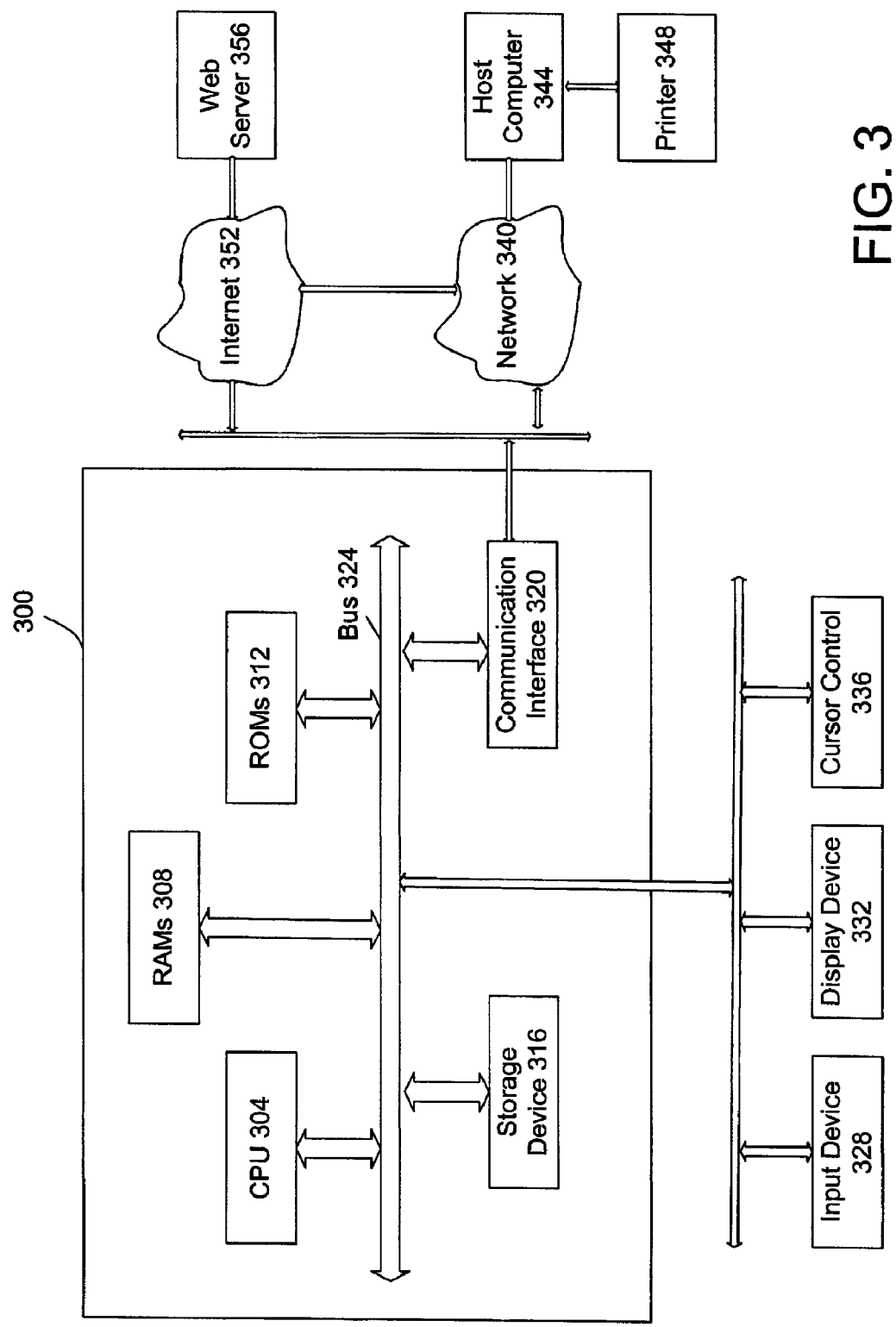
FIG. 3 shows a third system upon which techniques of the invention may be implemented.

FIG. 3 is a block diagram showing a computer system 300 upon which embodiments of the invention may be implemented. For example, computer system 300 may be implemented to include system 100, system 200, latency managers 112, 212, etc. In one embodiment, computer system 300 includes a processor 304, random access memories (RAMs) 308, read-only memories (ROMs) 312, a storage device 316, and a communication interface 320, all of which are connected to a bus 324.

Processor 304 controls logic, processes information, and coordinates activities within computer system 300. In one embodiment, processor 304 executes instructions stored in RAMs 308 and ROMs 312, by, for example, coordinating the movement of data from input device 328 to display device 332.

RAMs 308, usually being referred to as main memory, temporarily store information and instructions to be executed by processor 304. Information in RAMs 308 may be obtained from input device 328 or generated by processor 304 as part of the algorithmic processes required by the instructions that are executed by processor 304.

ROMs 312 store information and instructions that, once written in a ROM chip, are read-only and are not modified or removed. In one embodiment, ROMs 312 store commands for configurations and initial operations of computer system 300.

Storage device 316, such as floppy disks, disk drives, or tape drives, durably stores information for used by computer system 300.

Communication interface 320 enables computer system 300 to interface with other computers or devices. Communication interface 320 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 320 may also allow wireless communications.

Bus 324 can be any communication mechanism for communicating information for use by computer system 300. In the example of FIG. 3, bus 324 is a media for transferring data among processor 304, RAMs 308, ROMs 312, storage device 316, communication interface 320, etc.

Computer system 300 is typically coupled to an input device 328, a display device 332, and a cursor control 336. Input device 328, such as a keyboard including alphanumeric and other keys, communicates information and commands to processor 304. Display device 332, such as a cathode ray tube (CRT), displays information to users of computer system 300. Cursor control 336, such as a mouse, a trackball, or cursor direction keys, communicates direction information and commands to processor 304 and controls cursor movement on display device 332.

Computer system 300 may communicate with other computers or devices through one or more networks. For example, computer system 300, using communication interface 320, may communicate through a network 340 to another computer 344 connected to a printer 348, or through the world wide web 352 to a web server 356. The world wide web 352 is commonly referred to as the "Internet." Alternatively, computer system 300 may access the Internet 352 via network 340.

Computer system 300 may be used to implement the techniques described above. In various embodiments, processor 304 performs the steps of the techniques by executing instructions brought to RAMs 308. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 304 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. For example, the instructions to be executed by processor 304 are in the form of one or more software programs and are initially stored in a CD-ROM being interfaced with computer system 300 via bus 324. Computer system 300 loads these instructions in RAMs 308, executes some instructions, and sends some instructions via communication interface 320, a modem, and a telephone line to a network (e.g. 340, the Internet 352, etc). A remote computer, receiving data through a network cable, executes the received instructions and send the data to computer system 300 to be stored in storage device 316.

In the foregoing specification, the invention has been described with reference to various embodiments thereof. However, it will be evident that modifications and changes may be made thereto without departing from the broader spirit and scope of the invention. For example, to trigger a process switch, it is not necessary that an access time of a memory subsystem is greater than the threshold; the access time can be close to or equal to the threshold, etc. The techniques disclosed herein may be implemented as a method, an apparatus, a system, a device, or their equivalences, a computer-readable medium, etc. Accordingly, the specification and drawings are to be regarded as illustrative rather than as restrictive.

What is claimed is:

1. A method for managing a memory system having a plurality of subsystems, comprising the steps of:

upon accessing the memory system for a piece of data used by a first process determining an access time to acquire the piece of data in the memory system;

comparing the determined access time to a threshold; and taking actions based on results of the comparing step; including postponing execution of the first process and allowing execution of a second process;

wherein a value of the threshold is selected based on cost of switching processes for execution.

2. The method of claim 1 wherein an intelligence performing the steps of postponing and allowing upon a notification from a latency manager regarding a relationship between the determined access time and the threshold; the latency manager determining the relationship independent from the intelligence.

3. The method of claim 2 wherein the intelligence is selected from a group consisting of a processor working with the memory system, an operating system working with the memory system, software running on the processor, and a memory manager managing the memory system.

4. The method of claim 1 wherein the actions further include monitoring the memory system or a system using the memory system.

5. The method of claim 1 wherein the determined access time is selected as the longest access time of a plurality of access times each of which corresponds to a memory access in a multiple memory access.

6. The method of claim 1 further comprising the step of accessing the piece of data in more than one subsystem at the same time; one subsystem having a shorter access time and one subsystem having a longer access time; the determined access time being that of the subsystem having the shorter access time, and, if the piece of data is missed in the subsystem having the shorter access time, then the determined access time being that of the subsystem having the longer access time.

7. The method of claim 1 further comprising the step of updating a previously determined access time to the determined access time if the determined access time is greater than the previously determined access time.

8. The method of claim 1 further comprising the step of notifying an intelligence working with the memory system; the intelligence being selected from a group consisting of a processor, an operating system, software running on the processor, and a memory manager managing the memory system; the intelligence performing the step of taking actions.

9. The method of claim 1 further comprising the step of changing the determined access time upon performing a task selected from a group consisting of changing the threshold, initiating an interrupt to an intelligence working with the memory system, and postponing executing the first process and allowing executing a second process.

10. The method of claim 1 wherein the determined access time is selected from a time to access at least one subsystem.

11. The method of claim 1 wherein a latency manager performing the step of determining; the latency manager being on a data path between a processor working with the memory system and the plurality of subsystems.

12. The method of claim 1 wherein the data is accessed from a subsystem having a shorter access time to a subsystem having a longer access time or in a non-sequential order.

13. A method for managing a memory system having a plurality of subsystems, comprising the steps of:

comparing an access time of a subsystem to a threshold; a value of the threshold being selected based on cost of switching processes for execution;

earmarking the subsystem based on results of the comparing step;

from the plurality of subsystems, determining an order for data to be accessed from a subsystem having a shorter access time to a subsystem having a longer access time; and upon accessing the memory system for a piece of data used by a first process, if the data is missed in the earmarked subsystem, then postponing executing the first process and allowing executing a second process.

14. The method of claim 13 wherein an intelligence performing the steps of postponing and allowing upon notification from a latency manager regarding a relationship between the determined access time and the threshold; the intelligence being selected from a group consisting of a processor working with the memory system, an operating system working with the memory system, software running on the processor, a memory manager managing the memory system; the latency manger being part of managing the memory system.

15. An apparatus for managing a memory system having a plurality of subsystems, comprising:

means for, upon accessing the memory system for a piece of data used by a first process,
determining an access time to acquire the piece of data in the memory system;
comparing the determined access time to a threshold; and
taking actions based on results of the comparing step; including postponing execution of the first process and allowing execution of a second process; wherein a value of the threshold is selected based on cost of switching processes for execution.

16. The apparatus of claim 15 wherein the determined access time is selected as the longest access time of a plurality of access times each of which corresponds to a memory access in a multiple memory access.

17. The apparatus of claim 15 further comprising means for accessing the piece of data in more than one subsystem at the same time; one subsystem having a shorter access time and one subsystem having a longer access time; the determined access time being that of the subsystem having the shorter access time, and, if the piece of data is missed in the subsystem having the shorter access time, then the determined access time being that of the subsystem having the longer access time.

18. An apparatus for managing a memory system having a plurality of subsystems, comprising:

means for comparing an access time of a subsystem to a threshold; a value of the threshold being selected based on cost of switching processes for execution;

means for earmarking a subsystem; and means for determining, from the plurality of subsystems, an order for data to be accessed from a subsystem having a shorter access time to a subsystem having a longer access time;

wherein upon accessing the memory system for a piece of data used by a first process, if the data is missed in the earmarked subsystem, then postponing execution of the first process and allowing executing a second process.

19. A computer-readable medium embodying instructions for a computer to perform a method for managing a memory system having a plurality of subsystems, the method comprising the steps of:

upon accessing the memory system for a piece of data used by a first process,
determining an access time to acquire the piece of data in the memory system;
comparing the determined access time to a threshold; and
taking actions based on results of the comparing step; including postponing execution of the first process and allowing execution of a second process;
wherein a value of the threshold is selected based on cost of switching processes for execution.

20. The computer-readable medium of claim 19 wherein the determined access time is selected as the longest access time of a plurality of access times each of which corresponds to a memory access in a multiple memory access.

21. The computer-readable medium of claim 19 wherein the method further comprising the step of accessing the piece of data in more than one subsystem at the same time; one subsystem having a shorter access time and one subsystem having a longer access time; the determined access time being that of the subsystem having the shorter access time, and, if the piece of data is missed in the subsystem having the shorter access time, then the determined access time being that of the subsystem having the longer access time.

22. A computer-readable medium embodying instructions for a computer to perform a method for managing a memory system having a plurality of subsystems, the method comprising the steps of:

comparing an access time of a subsystem to a threshold; a value of the threshold being selected based on cost of switching processes for execution;

earmarking the subsystem based on results of the comparing step;

from the plurality of subsystems, determining an order for data to be accessed from a subsystem having a shorter access time to a subsystem having a longer access time; and upon accessing the memory system for a piece of data used by a first process, if the data is missed in the earmarked subsystem, then postponing executing the first process and allowing executing a second process.

23. The computer-readable medium of claim 19 wherein the actions further include monitoring the memory system or a system using the memory system.

24. The computer-readable medium of claim 19 wherein the method further comprising the step of updating a previously determined access time to the determined access time if the determined access time is greater than the previously determined access time.

25. The computer-medium of claim 1 wherein the determined access time is selected from a time to access at least one subsystem.

* * * * *